United States Patent
Abbe (10) Patent No.: US 11,778,129 B1
(45) Date of Patent: Oct. 3, 2023

(54) SYNCHRONIZATION OF IMAGE CAPTURE DEVICES PRIOR TO CAPTURE

(71) Applicant: GoPro, Inc., San Mateo, CA (US)

(72) Inventor: Guillaume Abbe, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/876,522

(22) Filed: Jul. 28, 2022

(51) Int. Cl.
*H04N 5/073* (2006.01)
*H04N 23/66* (2023.01)

(52) U.S. Cl.
CPC ........... *H04N 5/0733* (2013.01); *H04N 23/66* (2023.01)

(58) Field of Classification Search
CPC ........ H04N 23/66; H04N 5/04; H04N 21/242; H04N 5/0733; H04N 23/45
See application file for complete search history.

(56) References Cited

U.S. PATENT DOCUMENTS

| | | | |
|---|---|---|---|
| 6,654,141 B1 * | 11/2003 | Matsukubo | G06K 15/1843 347/15 |
| 10,477,076 B1 * | 11/2019 | Newman | H04N 21/21805 |
| 10,848,647 B1 * | 11/2020 | Bellomo | H04N 23/66 |
| 11,238,901 B1 * | 2/2022 | Lefebvre | H04R 1/02 |
| 11,330,204 B1 * | 5/2022 | Soundrapandian | H04N 23/73 |
| 2006/0007318 A1 * | 1/2006 | Kanayama | H04N 23/635 348/211.3 |
| 2016/0088210 A1 * | 3/2016 | Tanaka | H04N 23/661 348/207.11 |
| 2017/0223252 A1 * | 8/2017 | Tanaka | H04N 17/002 |

* cited by examiner

*Primary Examiner* — Chiawei Chen
(74) *Attorney, Agent, or Firm* — ESPLIN & ASSOCIATES, PC (57) ABSTRACT

Before capture of images, capture aspects of image capture devices (e.g., movement of image capture devices, sounds around image capture devices, GPS times of image capture devices) may be used to identify matching clock times of the image capture devices. Start of image capture by the image capture devices may be restricted using the matching clock times to time-synchronize images captured by different image capture devices.

20 Claims, 7 Drawing Sheets

SYNCHRONIZATION OF IMAGE CAPTURE DEVICES PRIOR TO CAPTURE

FIELD

This disclosure relates to synchronizing multiple image capture devices prior to capture of visual content.

BACKGROUND

Multiple image capture devices may be used to capture visual content (images, videos) at or near the same time. Synchronizing visual content captured by different image capture devices after capture may be difficult and/or time consuming.

SUMMARY

This disclosure relates to preparatorily synchronizing multiple image capture devices. First capture aspect information for a first image capture device, second capture aspect information for a second image capture device, and/or other information may be obtained. The first capture aspect information may characterize one or more capture aspects of the first image capture device within a synchronization-calibration duration. The second capture aspect information may characterize one or more capture aspects of the second image capture device within the synchronization-calibration duration. A matching pattern may be identified between the capture aspect(s) of the first image capture device and the capture aspect(s) of the second image capture device within the synchronization-calibration duration. The matching pattern may be used to identify a first clock time of the first image capture device as matching a second clock time of the second image capture device.

Capture of a first set of images by the first image capture device based on a first capture duration for individual images of the first image capture device, the first clock time of the first image capture device matching the second clock time of the second image capture device, and/or other information may be effectuated. The first set of images captured by the first image capture device may be time-synchronized with a second set of images captured by the second image capture device based on a second capture duration for individual images of the second image capture device, the second clock time of the second image capture device matching the first clock time of the first image capture device, and/or other information.

An electronic storage may store information relating to image capture devices, capture aspect information, information relating to capture aspect(s) of image capture devices, information relating to matching patterns between capture aspect(s) of different image capture devices, information relating to capture of images, information relating to time-synchronization of images captured by different image capture devices, and/or other information.

The processor(s) may be configured by machine-readable instructions. Executing the machine-readable instructions may cause the processor(s) to facilitate preparatorily synchronizing multiple image capture devices. The machine-readable instructions may include one or more computer program components. The computer program components may include one or more of a capture aspect component, a match component, a capture component, and/or other computer program components.

The capture aspect component may be configured to obtain capture aspect information for different image capture devices. The capture aspect component may be configured to obtain first capture aspect information for a first image capture device, second capture aspect information for a second image capture device, and/or other capture aspect information for other image capture device(s). The first capture aspect information may characterize one or more capture aspects of the first image capture device within a synchronization-calibration duration. The second capture aspect information may characterize one or more capture aspects of the second image capture device within the synchronization-calibration duration.

In some implementations, the aspect(s) of the first image capture device characterized by the first capture aspect information may include positions of the first image capture device within the synchronization-calibration duration, and the aspect(s) of the second image capture device characterized by the second capture aspect information may include positions of the second image capture device within the synchronization-calibration duration. In some implementations, the positions of the first image capture device characterized by the first capture aspect information may include acceleration of the first image capture device, and the positions of the second image capture device characterized by the second capture aspect information may include acceleration of the second image capture device.

The match component may be configured to identify a matching pattern between the capture aspect(s) of different image capture devices within the synchronization-calibration duration. The match component may be configured to identify a matching pattern between the capture aspect(s) of the first image capture device, the capture aspect(s) of the second image capture device, and/or the capture aspect(s) of other image capture device(s) within the synchronization-calibration duration. The matching pattern may be used to identify match between different clock times of different image capture devices. The matching pattern may be used to identify a first clock time of the first image capture device as matching a second clock time of the second image capture device and/or other clock time(s) of other image capture device(s).

In some implementations, the matching pattern identified between the capture aspect(s) of the first image capture device and the capture aspect(s) of the second image capture device within the synchronization-calibration duration may include a matching pattern of positions between the positions of the first image capture device and the positions of the second image capture device within the synchronization-calibration duration.

The capture component may be configured to effectuate capture of one or more sets of images by one or more image capture device. Capture of a set of images by an image capture device based on (1) capture duration for individual images of the image capture device, (2) a clock time of the image capture device matching a clock time of another image capture device, and/or other information may be effectuated. Capture of a first set of images by the first image capture device based on a first capture duration for individual images of the first image capture device, the first clock time of the first image capture device matching the second clock time of the second image capture device, and/or other information may be effectuated. The first set of images captured by the first image capture device may be time-synchronized with a second set of images captured by the second image capture device based on a second capture duration for individual images of the second image capture device, the second clock time of the second image capture device matching the first clock time of the first image capture device, and/or other information.

In some implementations, the capture of the first set of images by the first image capture device based on the first capture duration for individual images of the first image capture device and the first clock time of the first image capture device matching the second clock time of the second image capture device may include the first image capture device starting the capture of the first set of images at a moment that is after the first clock time of the first image capture device by an integer multiple of the first capture duration for individual images.

In some implementations, responsive to detection of user input to capture the first set of images at a first moment, start of the capture of the first set of images by the first image capture device may be delayed to a second moment that is after the first clock time of the first image capture device by the integer multiple of the first capture duration for individual images.

In some implementations, the capture of the first set of images by the first image capture device may be automatically started at the moment that is after the first clock time of the first image capture device by the integer multiple of the first capture duration for individual images based on the identification of the first clock time of the first image capture device as matching the second clock time of the second image capture device and/or other information. A value of the integer multiple may be set to cause a particular time delay in the capture of the first set of images by the first image capture device being automatically started.

In some implementations, the first set of images captured by the first image capture device and the second set of images captured by the second image capture device may be time-synchronized based on a first value of the integer multiple at which the capture of the first set of images is started by the first image capture device and a second value of the integer multiple at which the capture of the second set of images is started by the second image capture device. In some implementations, the first value of the integer multiple at which the capture of the first set of images is started by the first image capture device and the second value of the integer multiple at which the capture of the second set of images is started by the second image capture device may be different values.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
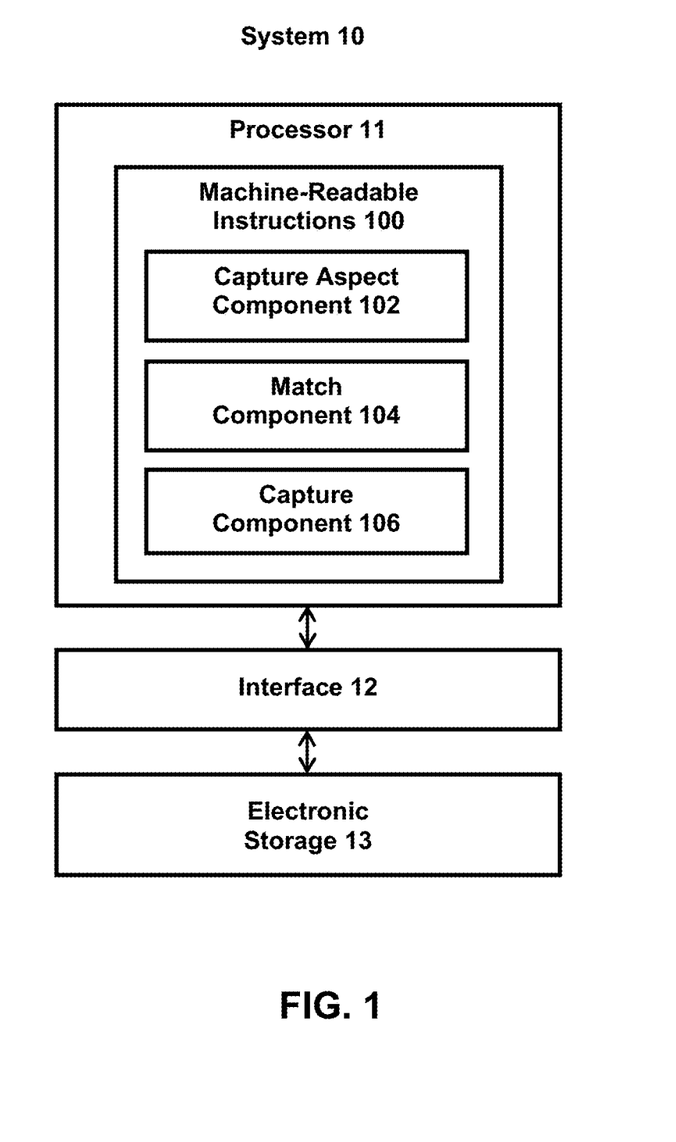
FIG. 1 illustrates an example system for preparatorily synchronizing multiple image capture devices.

FIG. 1 illustrates a system 10 for preparatorily synchronizing multiple image capture devices. The system 10 may include one or more of a processor 11, an interface 12 (e.g., bus, wireless interface), an electronic storage 13, and/or other components. The system 10 may include and/or be part of an image capture device. First capture aspect information for a first image capture device, second capture aspect information for a second image capture device, and/or other information may be obtained by the processor 11. The first capture aspect information may characterize one or more capture aspects of the first image capture device within a synchronization-calibration duration. The second capture aspect information may characterize one or more capture aspects of the second image capture device within the synchronization-calibration duration. A matching pattern may be identified by the processor 11 between the capture aspect(s) of the first image capture device and the capture aspect(s) of the second image capture device within the synchronization-calibration duration. The matching pattern may be used to identify a first clock time of the first image capture device as matching a second clock time of the second image capture device.

Capture of a first set of images by the first image capture device based on a first capture duration for individual images of the first image capture device, the first clock time of the first image capture device matching the second clock time of the second image capture device, and/or other information may be effectuated by the processor 11. The first set of images captured by the first image capture device may be time-synchronized with a second set of images captured by the second image capture device based on a second capture duration for individual images of the second image capture device, the second clock time of the second image capture device matching the first clock time of the first image capture device, and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to image capture devices, capture aspect information, information relating to capture aspect(s) of image capture devices, information relating to matching patterns between capture aspect(s) of different image capture devices, information relating to capture of images, information relating to time-synchronization of images captured by different image capture devices, and/or other information.

Visual content of images/video frames may be captured by an image capture device. A video may include video frames that define/contain the visual content of the video. As used herein, term video frame may be used to refer to one or more of an image frame, frame of pixels, encoded frame (e.g., I-frame, P-frame, B-frame), and/or other types of video frame.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from an image capture device or local to the image capture device. One or more portions of an image capture device may be remote from or a part of the system 10. One or more portions of the system 10 may be remote from or a part of an image capture device. For example, one or more components of the system 10 may be carried by a housing, such as a housing of an image capture device.

Figure 3:
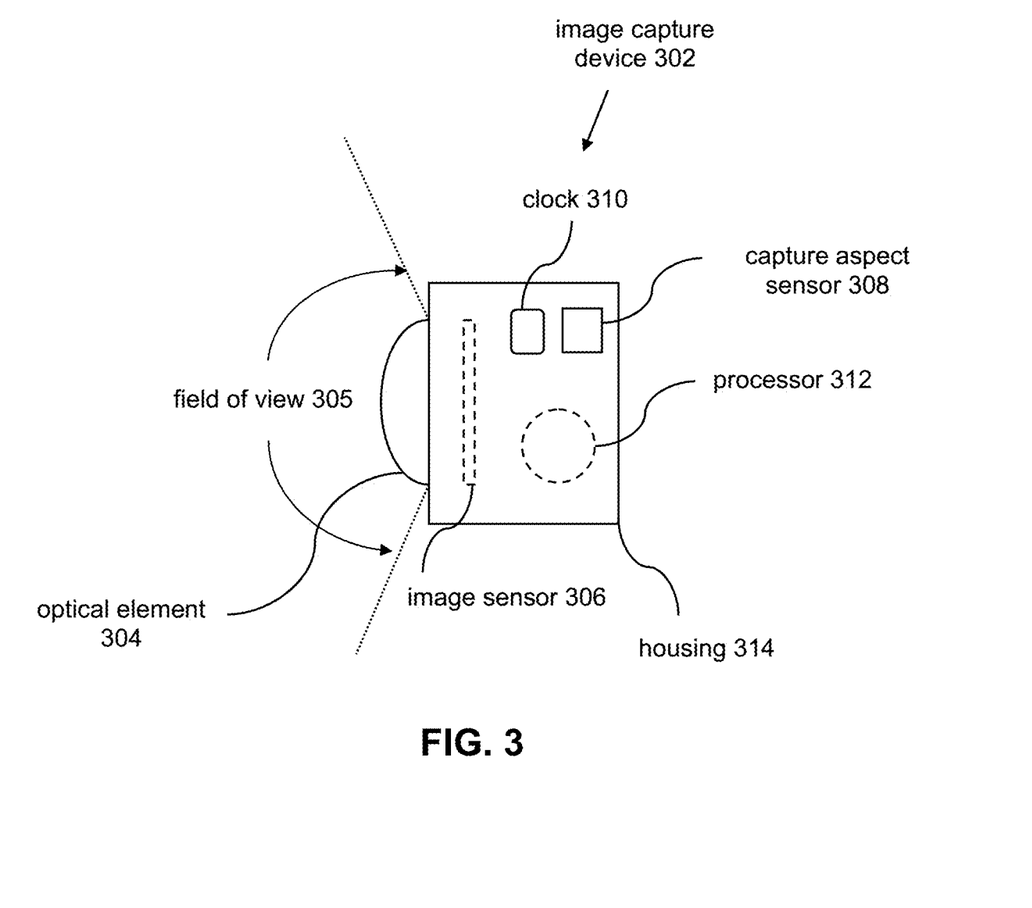
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 314. The housing 314 may refer a device (e.g., casing, shell) that covers, protects, and/or supports one or more components of the image capture device 302. The housing 314 may include a single-piece housing or a multi-piece housing. The housing 314 may carry (be attached to, support, hold, and/or otherwise carry) one or more of an optical element 304, an image sensor 306, a capture aspect sensor 308, a clock 310, a processor 312, and/or other components.

One or more components of the image capture device 302 may be the same as, be similar to, and/or correspond to one or more components of the system 10. For example, the processor 308 may be the same as, be similar to, and/or correspond to the processor 11. The image capture device 302 may include other components not shown in FIG. 3. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 302 may include multiple optical elements. For example, the image capture device 302 may include multiple optical elements that are arranged on the housing 314 to capture spherical images/videos (guide light within spherical field of view to one or more images sensors). For instance, the image capture device 302 may include two optical elements positioned on opposing sides of the housing 314. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 302 may include multiple image sensors. For example, the image capture device 302 may include multiple image sensors carried by the housing 314 to capture spherical images/videos based on light guided thereto by multiple optical elements. For instance, the image capture device 302 may include two image sensors configured to receive light from two optical elements positioned on opposing sides of the housing 314. The fields of views of the optical elements may overlap and enable capture of spherical images and/or spherical videos.

The capture aspect sensor 308 may refer to a sensor that detects and/or measures one or more physical aspects in which the image capture device 302 operates. The capture aspect sensor 308 may include one type of sensor or multiple types of sensors. For example, the capture aspect sensor 308 may include one or more of position sensor (e.g., inertial measurement unit, accelerometer, gyroscopes) that measures position and/or movement of the image capture device 302, GPS sensor (GPS receiver) that receives information from GPS satellite to enable determination of location of the image capture device 302 and/or GPS time for the image capture device 302, sound sensor (e.g., microphone) that records sounds around the image capture device 302, and/or other sensors.

The clock 310 may refer to a device for measuring time. The clock 310 may provide (e.g., make available for use, keep, track) the time of the image capture device 302. The clock 310 may include a hardware clock, a software clock, and/or other clock mechanisms. The time provided by the clock 310 may define the time at which the image capture device 302 operates. The time provided by the clock 310 may be used to determine when images are captured by the image capture device 302. The time provided by the clock 310 may be used as capture times for the images captured by the image capture device.

The processor 312 may include one or more processors (logic circuitry) that provide information processing capabilities in the image capture device 302. The processor 312 may provide one or more computing functions for the image capture device 302. The processor 312 may operate/send command signals to one or more components of the image capture device 302 to operate the image capture device 302. For example, the processor 312 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 312 may obtain information from the image sensor 306, the capture aspect sensor 308, and/or the clock 310. The processor 312 may facilitate transfer of information from the image sensor 306, the capture aspect sensor 308, and/or the clock 310 to another device/component. The processor 312 may be remote from the processor 11 or local to the processor 11. One or more portions of the processor 312 may be remote from the processor 11. One or more portions of the processor 312 may be part of the processor 11. The processor 312 may include and/or perform one or more functionalities of the processor 11 shown in FIG. 1.

Time at which images may be captured by the image capture device 302 may be stored and/or associated with the images. For example, the image captured by the image capture device 302 may include and/or be associated with timestamps that identify when the images were captured.

A user may wish to view and/or edit images (e.g., single images, video frames) captured by multiple image capture devices. The capture times of the image may be used to sort and/or organize the images for viewing/editing. However, differences between the times of different image capture devices may result in inaccurate sorting/organization of the images captured by the different image capture devices. For example, time of one image capture device may be faster/slower than time of another image capture device, and sorting/organizing images captured by both image capture device via capture times may result in images not being properly aligned. Differences between the times of different image capture device may result in the image captured by the different image capture devices not being time-synchronized. Differences between the times of different image capture device may make it difficult to view and/or edit images captured by different image capture devices.

The present disclosure provides calibration of multiple image capture devices before image capture (start of recording) so that the images captured by the multiple image capture devices are time-synchronized. That is, the multiple image capture devices are preparatorily synchronized so that the images captured by the multiple image capture devices are time-synchronized.

Before multiple image capture devices are used to capture images, the image capture devices may enter a synchronization/calibration mode. During the operation of the image capture devices in the calibration/sync synchronization/calibration mode (synchronization-calibration duration), one or more capture aspects of the image capture devices may be measured using capture aspect sensors. Matching pattern between the capture aspect(s) of different image capture device may be used to identify matching clock times of different image capture devices. For example, same matching pattern of capture aspect(s) may be found when the clock time of one image capture device reads 2:00 PM and the clock time of another image capture device reads 2:02 PM. 2:00 PM of one image capture device may be identified as matching (being the same actual time as) 2:02 PM of the other image capture device.

The matching clock times of image capture devices may be used to limit when the image capture devices can start capture of image. The capture of images by the image capture devices may be limited so that image capture may only start at specific times. Start of image capture by the image capture devices may be limited using (1) the matching clock times, (2) capture duration for individual images of the image capture devices, and/or other information. Start of image capture by the image capture devices may be limited to times that are after the matching clock times by an integer multiple of the capture duration for individual images.

For example, referring to the example of two image capture device, the image capture device with matching clock time of 2:00 PM may be configured to capture images at 60 frames per second. The capture duration for individual images of this image capture device may be $\frac{1}{60}$ second. The start of image capture by the image capture device may be limited so that the image capture device is only allowed to start capturing images at times that are after 2:00 PM by an integer multiple of $\frac{1}{60}$ second (e.g., 2:00 PM+1*$\frac{1}{60}$ second; 2:00 PM+2*$\frac{1}{60}$ second; 2:00 PM+3*$\frac{1}{60}$ second). Such restriction on start of image capture by the image capture devices may enable time-synchronization of images captured by different image capture devices, regardless of whether image capture is started at the same time by the different image capture devices.

While two image capture devices are used herein as example, this is not meant to be limiting. Present disclosure may be utilized to control capture of images by more than two image capture devices such that images captured by three or more image capture devices are time-synchronized.

Referring back to FIG. 1, the processor 11 (or one or more components of the processor 11) may be configured to obtain information to facilitate preparatorily synchronizing multiple image capture devices. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., sensor(s)) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate preparatorily synchronizing multiple image capture devices. The machine-readable instructions 100 may include one or more computer program components. The machine-readable instructions 100 may include one or more of a capture aspect component 102, a match component 104, a capture component 106, and/or other computer program components.

The capture aspect component 102 may be configured to obtain capture aspect information for different image capture devices. The capture aspect component 102 may be configured to obtain first capture aspect information for a first image capture device, second capture aspect information for a second image capture device, and/or other capture aspect information for other image capture device(s). Obtaining capture aspect information may include one or more of accessing, acquiring, analyzing, determining, examining, identifying, loading, locating, opening, receiving, retrieving, reviewing, selecting, storing, and/or otherwise obtaining the capture aspect information.

The capture aspect information may characterize one or more capture aspects of multiple image capture devices within a synchronization-calibration duration. The synchronization-calibration duration may refer to a duration of time in which capture aspect(s) of multiple image capture devices are detected, measured, and/or analyzed. The synchronization-calibration duration may refer to a duration of time in which matching clock times of multiple image capture devices are identified. In some implementations, the synchronization-calibration duration may begin/end based on the image capture devices entering/exiting a synchronization/calibration mode.

The capture aspect information may characterize capture aspect(s) of an image capture device by describing, defining, and/or otherwise characterizing the capture aspect(s) of an image capture device. For example, the capture aspect information may specify types and/or values of capture aspect(s) and/or include information from which types and/or values of capture aspect(s) may be determined. Other types of capture aspect information are contemplated.

Different capture aspect information may characterize capture aspect(s) of different image capture devices within the synchronization-calibration duration. The first capture aspect information may characterize capture aspect(s) of the first image capture device within a synchronization-calibration duration. The second capture aspect information may characterize one or more capture aspects of the second image capture device within the synchronization-calibration duration.

A capture aspect of an image capture device may refer to a particular condition, feature, manner, and/or other aspect in which the image capture device captures information. A capture aspect of an image capture device may include a particular state of the image capture device and/or particular state of the environment around the image capture device. For example, a capture aspect of an image capture device may include positions/movement of the image capture device, GPS time of the image capture device, sound recorded by the image capture device, and/or other capture aspect of the image capture device.

In some implementations, the aspect(s) of the image capture devices characterized by the capture aspect information may include positions of the image capture devices within the synchronization-calibration duration. Positions of the image capture devices characterized by the capture aspect information may include rotational positions of the image capture device and/or translational positions of the image capture device. Positions of the image capture devices characterized by the capture aspect information may include specific positions and/or changes in positions (e.g., velocity, acceleration) of the image capture devices at different points in time/durations of time. For example, when the image capture devices are in the synchronization/calibration mode, the image capture devices may be shaken together, and the shaking of the image capture devices may be used as a capture aspect of the image capture devices.

In some implementations, the aspect(s) of the image capture devices characterized by the capture aspect information may include GPS times of the image capture devices. GPS time of an image capture device may refer to time at the location of the image capture device. GPS time of an image capture device may be determined based on communication between the image capture device and GPS satellites. In some implementations, GPS time of an image capture device may be determined based on the image capture device operating in the synchronization/calibration mode. In some implementations, GPS time of an image capture device may be determined periodically. The GPS times of the image capture device may be use as a capture aspect of the image capture devices.

In some implementations, the aspect(s) of the image capture devices characterized by the capture aspect information may include sound recorded by the image capture devices. Sound recorded by the image capture devices may include sound made by one or more of the image capture devices and/or sound made by other sources. For example, when the image capture devices are in the synchronization/calibration mode, one or more of the image capture device may output a specific sound (e.g., beeping) as the image capture devices record sound as a capture aspect of the image capture device.

The match component 104 may be configured to identify a matching pattern between the capture aspect(s) of different image capture devices within the synchronization-calibration duration. For example, the match component 104 may be configured to identify a matching pattern between the capture aspect(s) of the first image capture device, the capture aspect(s) of the second image capture device, and/or the capture aspect(s) of other image capture device(s) within the synchronization-calibration duration. Identifying a matching pattern may include ascertaining, choosing, determining, establishing, finding, selecting, and/or otherwise identifying the matching pattern.

A matching pattern between the capture aspect(s) of different image capture devices within the synchronization-calibration duration may refer to the same pattern in different capture aspect(s) of different image capture device within the synchronization-calibration duration. A matching pattern between the capture aspect(s) of different image capture devices within the synchronization-calibration duration may refer to the patterns in different capture aspect(s) of different image capture device within the synchronization-calibration duration that are similar to each other (e.g., not deviate from one pattern by a threshold amount). A matching pattern between the capture aspect(s) of different image capture devices within the synchronization-calibration duration may be identified based on analysis of the capture aspect(s) and/or other information. A matching pattern between the capture aspect(s) of different image capture devices within the synchronization-calibration duration may be identified based on the capture aspect(s) of different image capture devices having the same values, similar values (e.g., within a threshold value), same changes in values, similar changes in values, and/or other information. Other identification of matching pattern is contemplated.

The matching pattern may be used to identify match between different clock times of different image capture devices. For example, the matching pattern may be used to identify a first clock time of the first image capture device as matching a second clock time of the second image capture device and/or other clock time(s) of other image capture device(s). The matching pattern may be used to identify when the same/similar capture aspect(s) were recorded/measured for the image capture devices. The matching pattern may be used to identify when one or more specific events (e.g., specific shake, specific GPS time, specific sound) were recorded by different image capture devices.

Identifying match between different clocks times of different image capture devices may include identifying that different clocks times of different image capture devices correspond to the same time. For example, identifying match between different clocks times of two image capture device may include identifying that at the same time, the clock time of one image capture device reads 2:00 PM while the clock time of another image capture device reads 2:02 PM. Identifying match between different clocks times of different image capture device may include the difference between the clock times of different image capture device (e.g., clock offset). For example, identifying match between different clocks times of two image capture device may include identifying that the clock of one image capture device is faster/slower than the clock of another image capture device.

In some implementations, the matching pattern identified between the capture aspect(s) of different image capture devices within the synchronization-calibration duration may include a matching pattern of positions between the positions of different image capture device. For example, values and/or changes in values of acceleration for multiple image capture device may be analyzed to identify the same pattern in the values and/or changes in values of acceleration for multiple image capture device. Clock times of individual image capture devices when they experienced the same movement may be identified as matching clock times.

In some implementations, the matching pattern identified between the capture aspect(s) of different image capture devices within the synchronization-calibration duration may include a matching pattern of GPS times between the GPS times of different image capture devices. For example, GPS times of image capture devices may be analyzed to find the same GPS time recorded by the image capture device. Clock times of individual image capture devices when they recorded the same GPS time may be identified as matching clock times.

In some implementations, the matching pattern identified between the capture aspect(s) of different image capture devices within the synchronization-calibration duration may include a matching pattern of sounds between sounds recorded by different image capture devices. For example, sounds recorded by the image capture device may be analyzed to find the same sound pattern (e.g., same intensity, same frequency). Clock times of individual image capture devices when they recorded the same sound pattern may be identified as matching clock times.

In some implementations, identification of the matching pattern and/or identification of matching between different clock times of different image capture devices may be performed by a single computing device and/or multiple computing devices. For example, capture aspect(s) of different image capture devices may be obtained by a single computing device (e.g., a single image capture device, a mobile device, such as a smartphone or a tablet), and the single computing device may identify the matching pattern and/or the match between different clock times of different image capture devices. As another example, capture aspect(s) of different image capture devices may be obtained by multiple computing devices (e.g., multiple image capture devices, multiple mobile devices). The matching pattern and/or the match between different clock times of different image capture devices may be determined based on communication between the multiple computing devices (e.g., multiple computing devices identifying the same matching pattern/matching clock times; matching pattern/matching clock time identified by one computing device compared against matching pattern/matching clock time identified by another computing device).

Figure 4:
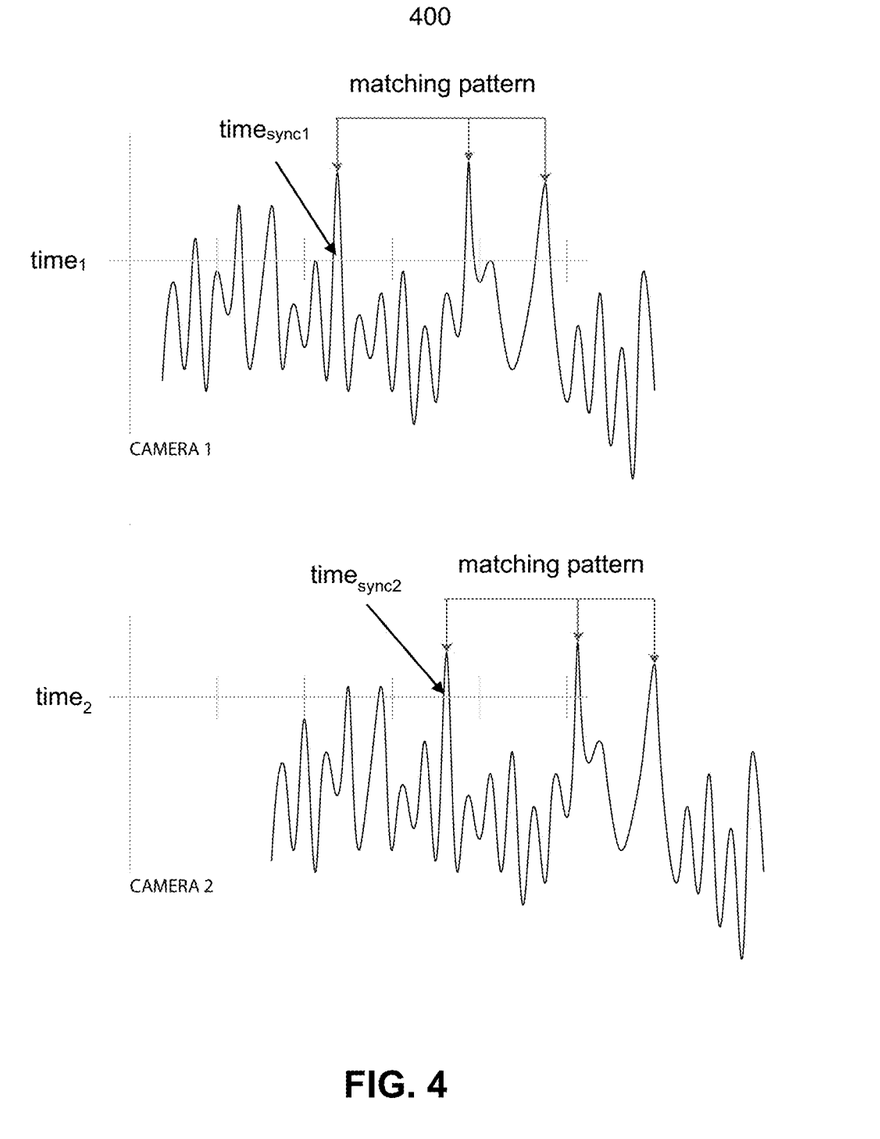
FIG. 4 illustrates an example capture aspect of multiple image capture devices.

FIG. 4 illustrates an example capture aspect of multiple image capture devices. Two image capture devices (camera 1, camera 2) may record a capture aspect during a synchronization-calibration duration. The time provided by the clock of camera 1 may be different from the time provided by the clock of camera 2. Difference in clock time may result in the same capture aspect being recorded by the image capture devices at different clock times. A matching pattern may be found between the capture aspect recorded by cameras 1 and 2 to identify specific clock times of cameras 1 and 2 that correspond to the same moment in time. For example, based on a matching pattern identified in the capture aspect, an earlier time ($time_{sync1}$) provided by the clock of camera 1 may be identified as matching a later time ($time_{sync2}$) provided by the clock of camera 2. The identified times of different cameras 1 and 2 may be stored as matching clock times ($time_{sync}=time_{sync1}$ and $time_{sync2}$). The matching clock times of different image capture devices may be referred to as synchronized clock times.

The capture component 106 may be configured to effectuate capture of one or more sets of images by one or more image capture device. Effectuating capture of a set of images by an image capture device may include bringing about, causing, controlling, facilitating, and/or otherwise effectuating capture of the set of images by the image capture device. Capture of a set of images by an image capture device may include capture of one or more images by the image capture device. An image capture device capturing an image may include the image capture device recording, storing, and/or otherwise capturing the image.

The capture component 106 may effectuate capture of a set of images by an image capture device based on (1) capture duration for individual images of the image capture device, (2) a clock time of the image capture device matching a clock time of another image capture device, and/or other information. For example, the capture component 106 may effectuate capture of a first set of images by the first image capture device based on a first capture duration for individual images of the first image capture device, the first clock time of the first image capture device matching the second clock time of the second image capture device, and/or other information. The capture component 106 may effectuate capture of a second set of images by the second image capture device based on a second capture duration for individual images of the second image capture device, the second clock time of the second image capture device matching the first clock time of the first image capture device, and/or other information. When an image capture device may begin to capture images may be limited based on (1) the capture duration for individual images, and (2) the matching clock time.

A capture duration for individual images of an image capture device may refer to how long it takes for the image capture device to capture a single image. A capture duration for individual images of an image capture device may refer to an amount of time assigned to the image capture device to capture a single image. A capture duration for individual images of an image capture device may be multiplicative inverse of the frame rate used to capture images (e.g., 1/FPS). A capture duration for individual images of an image capture device may be referred to as a frame capture duration. The frame capture duration for different image capture device may be same or different. In some implementations, the frame capture duration for different image capture device may be required to be the same. In some implementations, differences between the frame capture duration for different image capture device may be controlled so that the frame capture duration for one image capture device is multiple of frame capture duration for another image capture device.

Different sets of image captured by the different image capture devices may be time-synchronized with each other. For example, the first set of images captured by the first image capture device may be time-synchronized with the second set of images captured by the second image capture device. Different sets of image captured by the different image capture devices may be time-synchronized with each other based on use of (1) the capture duration for individual images, and (2) the matching clock time to limit when image capture devices are allowed to start image capture.

In some implementations, capture of a set of images by an image capture device based on (1) the capture duration for individual images of the image capture device and (2) a clock time of the image capture device matching a clock time of other image capture device(s) may include the image capture device starting the capture of the set of images at a moment that is after the matching clock time of the image capture device by an integer multiple of the capture duration for individual images. The image capture device may be allowed to start image capture only at specific points in time. The image capture device may be allowed to start image capture only at points in time that are spaced apart from the matching clock time by an integer multiple of the capture duration for individual images.

Such restriction of image capture on different image capture devices may result in different sets of images captured by different image capture devices being time-synchronized. Such restriction of image capture on different image capture devices may enable different sets of images captured by different image capture devices being time-synchronized via use of when image capture was started, rather than clock times of image capture devices when the images were captured. Time-synchronization of different sets of images may include images captured by different image capture devices being accurately aligned so that images are ordered based on when they were actually captured, even if the clock times of the image capture devices are different. Time-synchronization of different sets of images may include images captured by different image capture devices being aligned based on (1) when image capture was started, and (2) frame capture duration(s).

In some implementations, capture of images by different image capture devices may be started at the same time. For example, different image capture devices may start capturing images at the same time by using same value of integer multiple to initiate image capture after the same period of time after synchronized clock times. In some implementations, capture of images by different image capture devices may be started at different time. For example, different image capture devices may start capturing images at different times by using different values of integer multiple to initiate image capture after different periods of time after synchronized clock times.

Figure 5A:
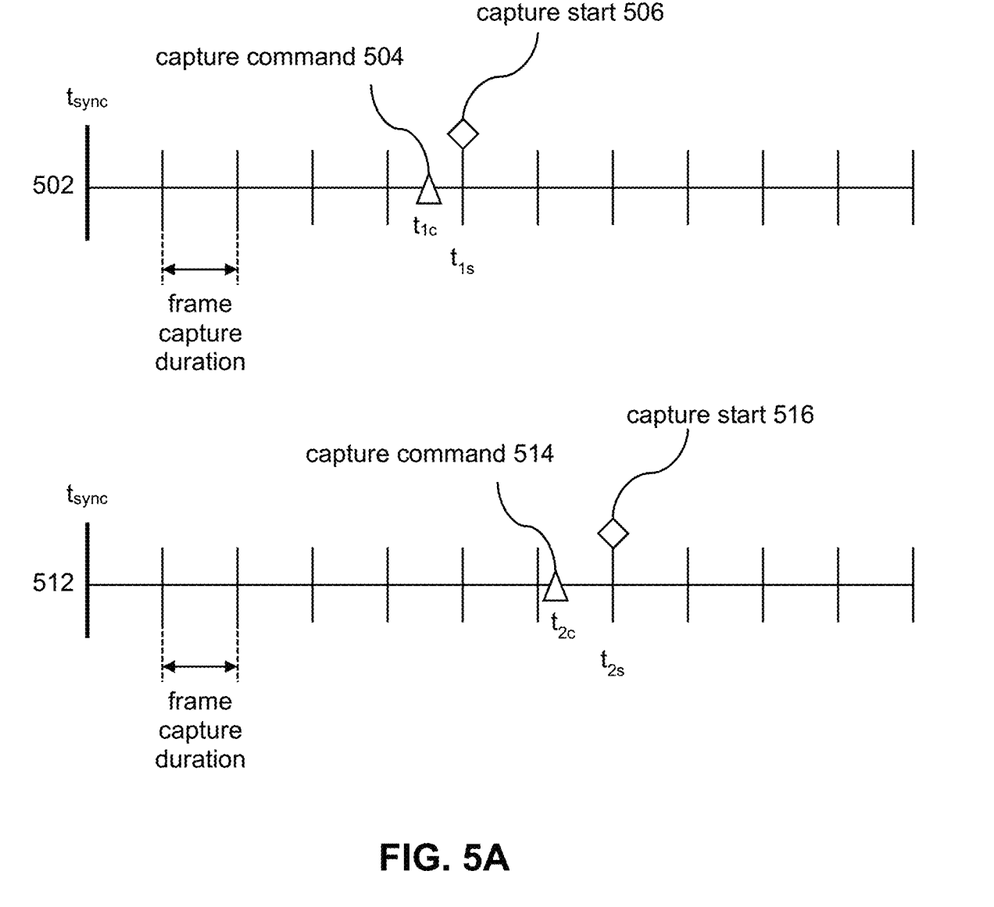
FIG. 5A illustrates example capture of images based on frame capture duration and synchronized clock times of image capture devices.
Figure 5B:
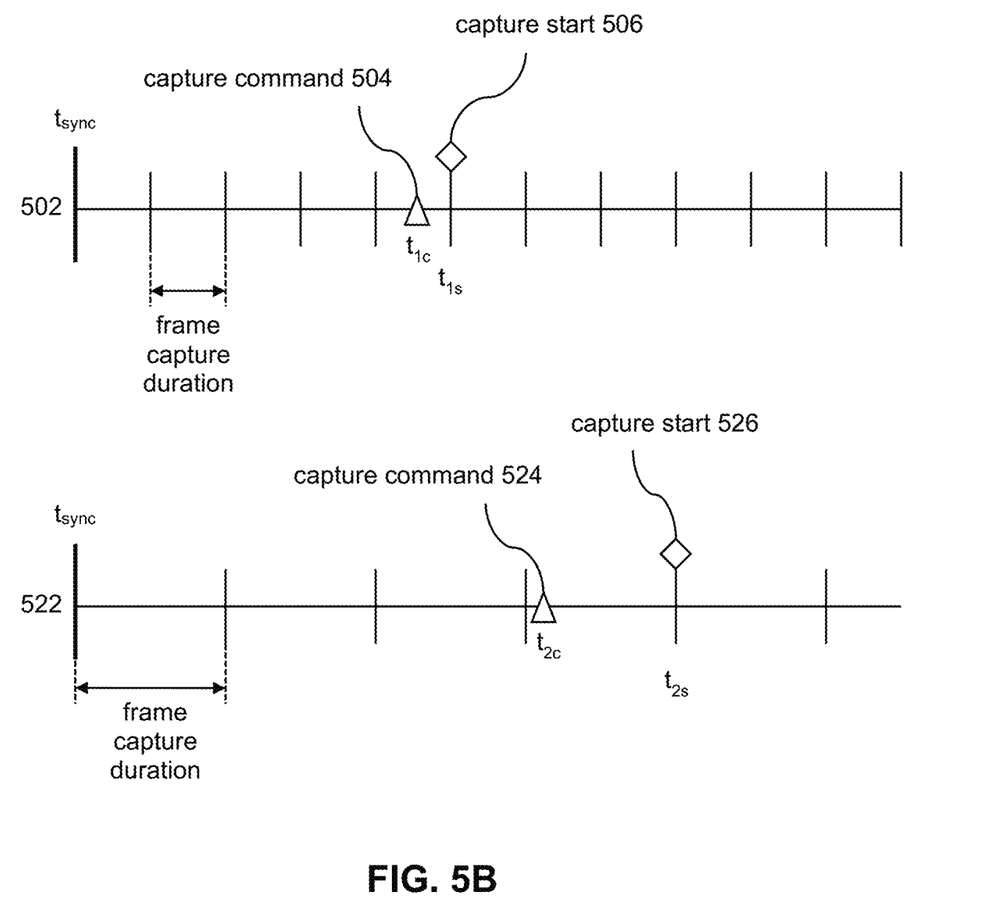
FIG. 5B illustrates example capture of images based on frame capture duration and synchronized clock times of image capture devices.
Figure 5C:
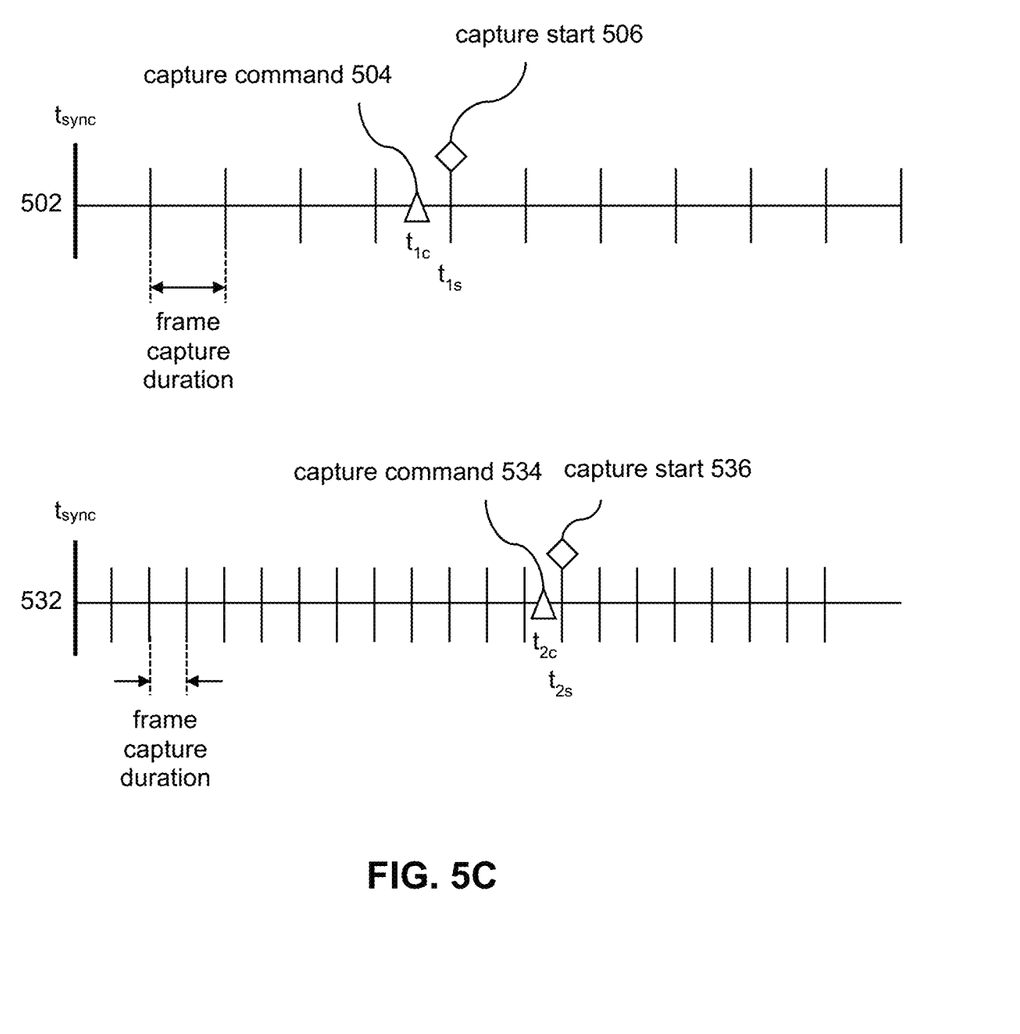
FIG. 5C illustrates example capture of images based on frame capture duration and synchronized clock times of image capture devices.

FIGS. 5A, 5B, and 5C illustrate example capture of images based on frame capture duration and synchronized clock times of image capture devices. In FIGS. 5A, 5B, and 5C, $t_{sync}$ may refer to synchronized clock times of two image capture devices. The clock times of image capture device that are identified as synchronized clock times may have the same value (e.g., clocks of image capture device provides same time) or different values (e.g., clocks of image capture device provides different times). Frame capture duration may refer to an image capture device's capture duration for individual images. Capture command may refer to a manual and/or automatic command that prompts an image capture device to start capture of images. Capture start may refer to a time when the image capture device starts capture of images. As shown in FIGS. 5A, 5B, and 5C, the current disclosure enables frame-level synchronization between images captured by different image capture devices.

Referring to FIG. 5A, synchronized clock times of two image capture devices 502, 512 may be identified. The image capture devices 502, 512 may have the same frame capture duration. For example, the image capture devices 502, 512 may use the same value of frame rate to capture images. Capture command 504 may be received by the image capture device 502 at time $t_{1c}$. Start of image capture 506 by the image capture device 502 may be delayed to time $t_{1s}$. Time duration between the synchronized clock times ($t_{sync}$) and the capture start time $t_{1s}$ may be five times the frame capture duration. Capture command 514 may be received by the image capture device 512 at time $t_{2c}$. Start of image capture 516 by the image capture device 512 may be delayed to time $t_{2s}$. Time duration between the synchronized clock times ($t_{sync}$) and the capture start time $t_{2s}$ may be seven times the frame capture duration.

Referring to FIG. 5B, synchronized clock times of two image capture devices 502, 522 may be identified. The image capture devices 502, 522 may have the different frame capture durations. The frame capture duration of the image capture device 522 may be twice the frame capture duration of the image capture device 502. For example, the value of the frame rate used by the image capture device 502 to capture images may be twice the value of the frame rate used by the image capture device 522 to capture images. Capture command 504 may be received by the image capture device 502 at time $t_{1c}$. Start of image capture 506 by the image capture device 502 may be delayed to time $t_{1s}$. Time duration between the synchronized clock times ($t_{sync}$) the capture start time $t_{1s}$ may be five times the frame capture duration. Capture command 524 may be received by the image capture device 522 at time $t_{2c}$. Start of image capture 526 by the image capture device 522 may be delayed to time $t_{2s}$. Time duration between the synchronized clock times ($t_{sync}$) and the capture start time $t_{2s}$ may be four times the frame capture duration.

Referring to FIG. 5C, synchronized clock times of two image capture devices 502, 532 may be identified. The image capture devices 502, 532 may have the different frame capture durations. The frame capture duration of the image capture device 532 may be half the frame capture duration of the image capture device 502. For example, the value of the frame rate used by the image capture device 502 to capture images may be half the value of the frame rate used by the image capture device 532 to capture images. Capture command 504 may be received by the image capture device 502 at time $t_{1c}$. Start of image capture 506 by the image capture device 502 may be delayed to time $t_{1s}$. Time duration between the synchronized clock times ($t_{sync}$) and the capture start time $t_{1s}$ may be five times the frame capture duration. Capture command 534 may be received by the image capture device 532 at time $t_{2c}$. Start of image capture 536 by the image capture device 532 may be delayed to time $t_{2s}$. Time duration between the synchronized clock times ($t_{sync}$) land the capture start time $t_{2s}$ may be thirteen times the frame capture duration.

While FIGS. 5A, 5B, and 5C show capture start time following capture command time at the earliest time possible, this is merely as an example and is not meant to be limiting. In some implementations, other delay(s) may be added between the capture command time and the capture start time.

The image capture devices 502, 512, 522, 532 may store time information relating capture of images. For example, for a set of images captured by an image capture device, the image capture device may store one or more of a capture session identifier (identifying capture session), synchronized clock time, capture start time, and/or other information. As another example, for a set of images captured by an image capture device, the image capture device may store one or more of a capture session identifier, synchronized clock time, duration of time between synchronized time and capture start time, and/or other information. As yet another example, for a set of images captured by an image capture device, the image capture device may store one or more of a capture session identifier, synchronized clock time, number of frame capture durations between synchronized time and capture start time, and/or other information.

Time information relating to capture of images may be used to time-synchronize images captured by different image capture devices. For example, referring to FIG. 5A, the time information may be used to determine that the capture start 516 of the image capture device 512 is two frame capture durations after the capture start 506 of the image capture device 502. Based on this difference in capture start times and the use of same frame capture duration, the third image captured by the image capture device 502 may be synchronized with the first image captured by the image capture device 512, and same two-frame distance relationship may be used to synchronize other images captured by the image capture device 512 with the images captured by the image capture device 502.

Referring to FIG. 5B, the time information may be used to determine that the capture start 526 of the image capture device 522 is one and a half frame capture durations (of the image capture device 522) after the capture start 506 of the image capture device 502. Based on this difference in capture start times and use of different frame capture durations, the fourth image captured by the image capture device 502 may be synchronized with the first image captured by the image capture device 522, and every image captured afterwards by the image capture device 522 may be synchronized with every other image captured afterwards by the image capture device 502.

Referring to FIG. 5C, the time information may be used to determine that the capture start 536 of the image capture device 532 is three frame capture durations (of the image capture device 532) after the capture start 506 of the image capture device 502. Based on this difference in capture start times and use of different frame capture durations, the third image captured by the image capture device 502 may be synchronized with the second image captured by the image capture device 532, and every other image captured afterwards by the image capture device 532 may be synchronized with every image captured afterwards by the image capture device 502.

In some implementations, responsive to detection of user input to an image capture device to capture a set of images at a particular moment, start of the capture of the set of images by the image capture device may be delayed to a later moment. The capture start may be delayed so that it coincides a time that is after the synchronized clock time by an integer multiple of the capture duration for individual images. In some implementations, the capture stat may be delayed to the earliest time that is after the synchronized clock time by an integer multiple of the capture duration for individual images. In some implementations, the capture start may be delayed to a later time by requiring additional time delay between when user input to capture images is detected and when the capture of images is started.

In some implementations, capture of a set of images by an image capture device may be automatically started based on identification of a clock time of the image capture device as matching a click time of another image capture device, and/or other information. For example, identification of synchronized clock times of multiple image capture devices may prompt some or all of the image capture devices to automatically start capturing images. The capture of images by an image capture device may start at a moment that is after the synchronized clock time of the image capture device by an integer multiple of the capture duration for individual images. The value of integer multiple used to determine capture start time may be set to cause a particular time delay in automatic capture of images. For example, the delay may be minimized by using the minimum integer value that will place the capture start time closest to the clock synchronization. The delay may be increased by using larger integer value.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. For example, one or more computer program component may be located within processing unit(s) of an image capture device and one or more computer program component may be located within processing unit(s) of a computing device.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
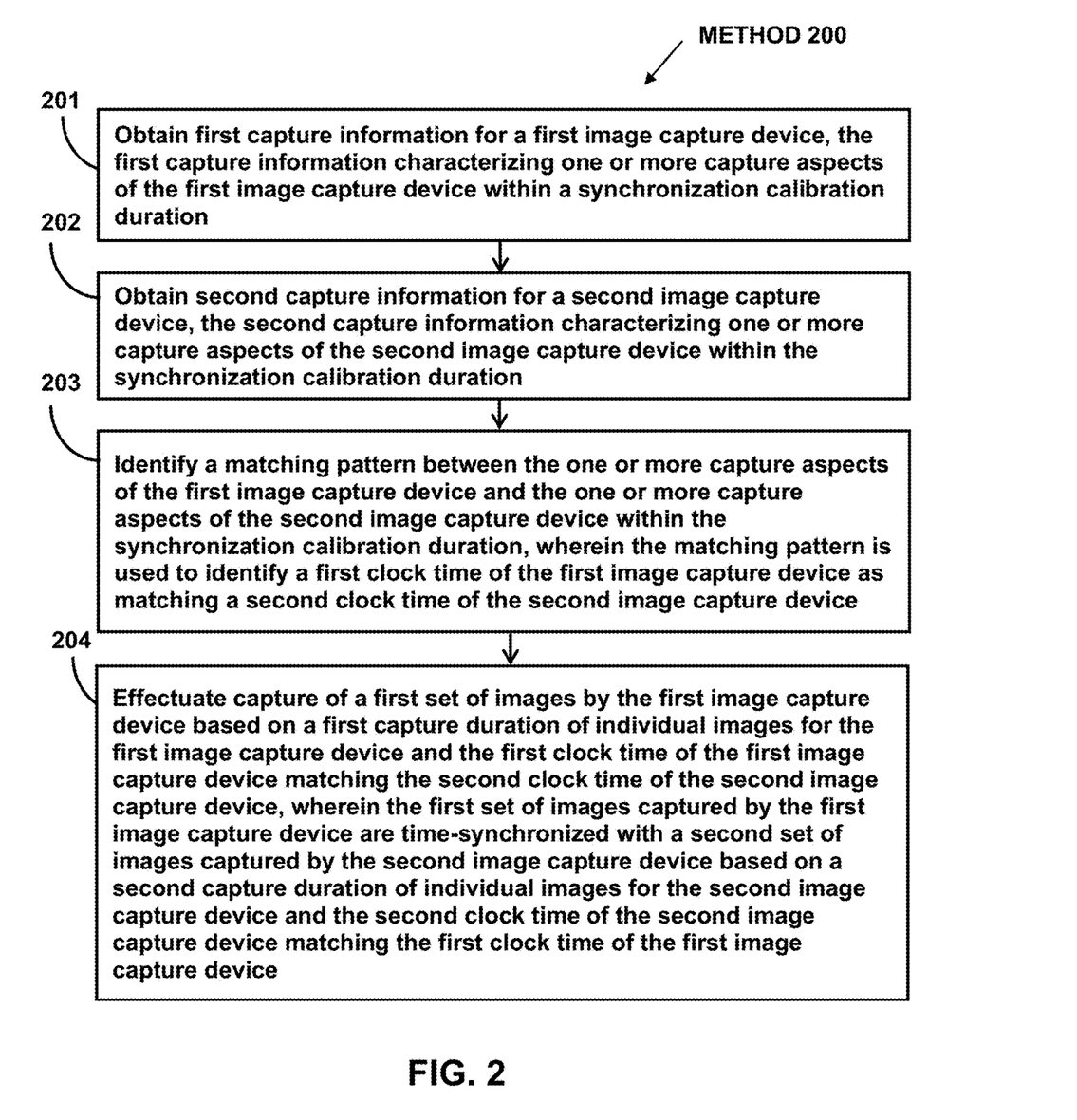
FIG. 2 illustrates an example method for preparatorily synchronizing multiple image capture devices.

FIG. 2 illustrates method 200 for preparatorily synchronizing multiple image capture devices. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, first capture aspect information for a first image capture device may be obtained. The first capture aspect information may characterize one or more capture aspects of the first image capture device within a synchronization-calibration duration. In some implementation, operation 201 may be performed by a processor component the same as or similar to the capture aspect component 102 (Shown in FIG. 1 and described herein).

At operation 202, second capture aspect information for a second image capture device may be obtained. The second capture aspect information may characterize one or more capture aspects of the second image capture device within the synchronization-calibration duration. In some implementations, operation 202 may be performed by a processor component the same as or similar to the capture aspect component 102 (Shown in FIG. 1 and described herein).

At operation 203, a matching pattern may be identified between the capture aspect(s) of the first image capture device and the capture aspect(s) of the second image capture device within the synchronization-calibration duration. The matching pattern may be used to identify a first clock time of the first image capture device as matching a second clock time of the second image capture device. In some implementations, operation 203 may be performed by a processor component the same as or similar to the match component 104 (Shown in FIG. 1 and described herein).

At operation 204, capture of a first set of images by the first image capture device based on a first capture duration for individual images of the first image capture device, the first clock time of the first image capture device matching the second clock time of the second image capture device, and/or other information may be effectuated. The first set of images captured by the first image capture device may be time-synchronized with a second set of images captured by the second image capture device based on a second capture duration for individual images of the second image capture device, the second clock time of the second image capture device matching the first clock time of the first image capture device, and/or other information. In some implementations, operation 204 may be performed by a processor component the same as or similar to the capture component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for preparatorily synchronizing multiple image capture devices, the system comprising:
    one or more physical processors configured by machine-readable instructions to:
        obtain first capture aspect information for a first image capture device, the first capture aspect information characterizing one or more capture aspects of the first image capture device within a synchronization-calibration duration;
        obtain second capture aspect information for a second image capture device, the second capture aspect information characterizing one or more capture aspects of the second image capture device within the synchronization-calibration duration;
        identify a matching pattern between the one or more capture aspects of the first image capture device and the one or more capture aspects of the second image capture device within the synchronization-calibration duration, wherein the matching pattern is used to identify a first clock time of the first image capture device as matching a second clock time of the second image capture device; and
        effectuate capture of a first set of images by the first image capture device based on a first capture duration for individual images of the first image capture device and the first clock time of the first image capture device matching the second clock time of the second image capture device, wherein the first set of images captured by the first image capture device are time-synchronized with a second set of images captured by the second image capture device based on a second capture duration for individual images of the second image capture device and the second clock time of the second image capture device matching the first clock time of the first image capture device;
    wherein:
        the capture of the first set of images by the first image capture device based on the first capture duration for individual images of the first image capture device and the first clock time of the first image capture device matching the second clock time of the second image capture device includes the first image capture device starting the capture of the first set of images at a moment that is after the first clock time of the first image capture device by an integer multiple of the first capture duration for individual images; and
        the first set of images captured by the first image capture device and the second set of images captured by the second image capture device are time-synchronized based on a first value of the integer multiple at which the capture of the first set of images is started by the first image capture device and a second value of the integer multiple at which the capture of the second set of images is started by the second image capture device.

2. The system of claim 1, wherein:
    responsive to detection of user input to capture the first set of images at a first moment, start of the capture of the first set of images by the first image capture device is delayed to a second moment that is after the first clock time of the first image capture device by the integer multiple of the first capture duration for individual images; or the capture of the first set of images by the first image capture device is automatically started at the moment that is after the first clock time of the first image capture device by the integer multiple of the first capture duration for individual images based on the identification of the first clock time of the first image capture device as matching the second clock time of the second image capture device.

3. A system for preparatorily synchronizing multiple image capture devices, the system comprising:
one or more physical processors configured by machine-readable instructions to:
obtain first capture aspect information for a first image capture device, the first capture aspect information characterizing one or more capture aspects of the first image capture device within a synchronization-calibration duration;
obtain second capture aspect information for a second image capture device, the second capture aspect information characterizing one or more capture aspects of the second image capture device within the synchronization-calibration duration;
identify a matching pattern between the one or more capture aspects of the first image capture device and the one or more capture aspects of the second image capture device within the synchronization-calibration duration, wherein the matching pattern is used to identify a first clock time of the first image capture device as matching a second clock time of the second image capture device; and
effectuate capture of a first set of images by the first image capture device based on a first capture duration for individual images of the first image capture device and the first clock time of the first image capture device matching the second clock time of the second image capture device, wherein the first set of images captured by the first image capture device are time-synchronized with a second set of images captured by the second image capture device based on a second capture duration for individual images of the second image capture device and the second clock time of the second image capture device matching the first clock time of the first image capture device.

4. The system of claim 3, wherein the capture of the first set of images by the first image capture device based on the first capture duration for individual images of the first image capture device and the first clock time of the first image capture device matching the second clock time of the second image capture device includes the first image capture device starting the capture of the first set of images at a moment that is after the first clock time of the first image capture device by an integer multiple of the first capture duration for individual images.

5. The system of claim 4, wherein responsive to detection of user input to capture the first set of images at a first moment, start of the capture of the first set of images by the first image capture device is delayed to a second moment that is after the first clock time of the first image capture device by the integer multiple of the first capture duration for individual images.

6. The system of claim 4, wherein the capture of the first set of images by the first image capture device is automatically started at the moment that is after the first clock time of the first image capture device by the integer multiple of the first capture duration for individual images based on the identification of the first clock time of the first image capture device as matching the second clock time of the second image capture device.

7. The system of claim 6, wherein a value of the integer multiple is set to cause a particular time delay in the capture of the first set of images by the first image capture device being automatically started.

8. The system of claim 4, wherein the first set of images captured by the first image capture device and the second set of images captured by the second image capture device are time-synchronized based on a first value of the integer multiple at which the capture of the first set of images is started by the first image capture device and a second value of the integer multiple at which the capture of the second set of images is started by the second image capture device.

9. The system of claim 8, wherein the first value of the integer multiple at which the capture of the first set of images is started by the first image capture device and the second value of the integer multiple at which the capture of the second set of images is started by the second image capture device are different values.

10. The system of claim 3, wherein:
the one or more aspects of the first image capture device characterized by the first capture aspect information include positions of the first image capture device within the synchronization-calibration duration;
the one or more aspects of the second image capture device characterized by the second capture aspect information include positions of the second image capture device within the synchronization-calibration duration; and
the matching pattern identified between the one or more capture aspects of the first image capture device and the one or more capture aspects of the second image capture device within the synchronization-calibration duration include a matching pattern of positions between the positions of the first image capture device and the positions of the second image capture device within the synchronization-calibration duration.

11. The system of claim 3, wherein:
the positions of the first image capture device characterized by the first capture aspect information include acceleration of the first image capture device; and
the positions of the second image capture device characterized by the second capture aspect information include acceleration of the second image capture device.

12. A method for preparatorily synchronizing multiple image capture devices, the method performed by a computing system including one or more processors, the method comprising:
obtaining, by the computing system, first capture aspect information for a first image capture device, the first capture aspect information characterizing one or more capture aspects of the first image capture device within a synchronization-calibration duration;
obtaining, by the computing system, second capture aspect information for a second image capture device, the second capture aspect information characterizing one or more capture aspects of the second image capture device within the synchronization-calibration duration;
identifying, by the computing system, a matching pattern between the one or more capture aspects of the first image capture device and the one or more capture aspects of the second image capture device within the synchronization-calibration duration, wherein the matching pattern is used to identify a first clock time of the first image capture device as matching a second clock time of the second image capture device; and effectuating, by the computing system, capture of a first set of images by the first image capture device based on a first capture duration for individual images of the first image capture device and the first clock time of the first image capture device matching the second clock time of the second image capture device, wherein the first set of images captured by the first image capture device are time-synchronized with a second set of images captured by the second image capture device based on a second capture duration for individual images of the second image capture device and the second clock time of the second image capture device matching the first clock time of the first image capture device.

13. The method of claim 12, wherein the capture of the first set of images by the first image capture device based on the first capture duration for individual images of the first image capture device and the first clock time of the first image capture device matching the second clock time of the second image capture device includes the first image capture device starting the capture of the first set of images at a moment that is after the first clock time of the first image capture device by an integer multiple of the first capture duration for individual images.

14. The method of claim 13, wherein responsive to detection of user input to capture the first set of images at a first moment, start of the capture of the first set of images by the first image capture device is delayed to a second moment that is after the first clock time of the first image capture device by the integer multiple of the first capture duration for individual images.

15. The method of claim 13, wherein the capture of the first set of images by the first image capture device is automatically started at the moment that is after the first clock time of the first image capture device by the integer multiple of the first capture duration for individual images based on the identification of the first clock time of the first image capture device as matching the second clock time of the second image capture device.

16. The method of claim 15, wherein a value of the integer multiple is set to cause a particular time delay in the capture of the first set of images by the first image capture device being automatically started.

17. The method of claim 13, wherein the first set of images captured by the first image capture device and the second set of images captured by the second image capture device are time-synchronized based on a first value of the integer multiple at which the capture of the first set of images is started by the first image capture device and a second value of the integer multiple at which the capture of the second set of images is started by the second image capture device.

18. The method of claim 17, wherein the first value of the integer multiple at which the capture of the first set of images is started by the first image capture device and the second value of the integer multiple at which the capture of the second set of images is started by the second image capture device are different values.

19. The method of claim 12, wherein:

the one or more aspects of the first image capture device characterized by the first capture aspect information include positions of the first image capture device within the synchronization-calibration duration;

the one or more aspects of the second image capture device characterized by the second capture aspect information include positions of the second image capture device within the synchronization-calibration duration; and the matching pattern identified between the one or more capture aspects of the first image capture device and the one or more capture aspects of the second image capture device within the synchronization-calibration duration include a matching pattern of positions between the positions of the first image capture device and the positions of the second image capture device within the synchronization-calibration duration.

20. The method of claim 12, wherein:

the positions of the first image capture device characterized by the first capture aspect information include acceleration of the first image capture device; and the positions of the second image capture device characterized by the second capture aspect information include acceleration of the second image capture device.

* * * * *